(No Model.)
C. KEELER.
PATTERN DEVICE FOR MAKING RE-ENFORCE BUTTON HOLES.
No. 423,327. Patented Mar. 11, 1890.
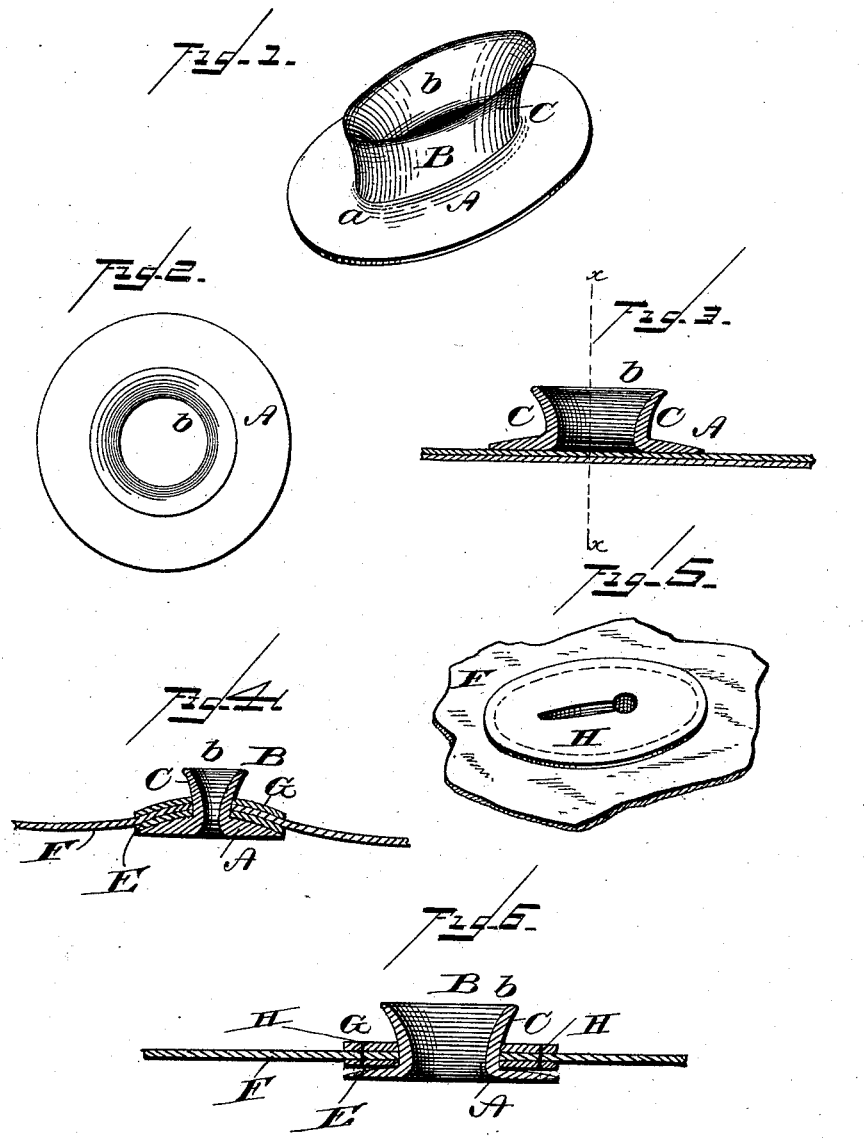

UNITED STATES PATENT OFFICE.

CALVIN KEELER, OF HOBART, NEW YORK.

PATTERN DEVICE FOR MAKING RE-ENFORCE BUTTON-HOLES.

SPECIFICATION forming part of Letters Patent No. 423,327, dated March 11, 1890.

Application filed July 11, 1889. Serial No. 317,158. (No model.)

*To all whom it may concern:*

Be it known that I, CALVIN KEELER, a citizen of the United States, and a resident of Hobart, in the county of Delaware and State of New York, have invented certain new and useful Improvements in Devices for Making Re-enforced Button-Holes; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my device for making re-enforced button-holes in the form in which it is applied to oblong or elongated button-holes. Fig. 2 is a plan view of a similar device as applied to round or circular button-holes. Fig. 3 is a longitudinal sectional view illustrating the application and use of the device. Fig. 4 is a similar view, but showing a transverse section, on line $xx$ in Fig. 3. Fig. 5 is a perspective view of a re-enforced button-hole, and Fig. 6 is a sectional view of the same.

Like letters of reference denote corresponding parts in all the figures.

This invention relates to the re-enforcing of the button-holes in garments by patches made of rubber, leather, or other suitable material adapted to such purpose, and has for its object to provide for the perfect alignment of the re-enforcing fabric around the button-hole on both sides of the garment.

To this end it consists in a peculiarly-constructed registering and guiding device of metal or other suitable material, which is constructed and used substantially as will be hereinafter more fully described.

The device, which is preferably made in one piece, consists of a flat base A of a size and shape conforming to the size and shape of the re-enforcing patches. Thus in Fig. 1 I have shown the form of device used for elongated button-holes and oblong patches, while Fig. 2 illustrates the form of device as adapted to round button-holes and circular re-enforcing patches. The flat base A has an upwardly-projecting tubular boss B of a shape corresponding approximately to the shape of the button-hole and having concave or undercut sides and ends, as shown at C.

In the device as used on oblong button-holes one end of this hollow boss is slightly larger than the other, so as to make one end of the re enforced button-hole (where it engages the shank of the button) slightly larger than the other end, as is customary in this class of button-holes.

To use the device the re-enforcing patches are cut from the rubber, leather, or cloth fabric from which they are to be made by placing the flat base A upon the fabric and, using it as a pattern or guide, cutting around its edge with a sharp knife, so that all the patches will be of even size and shape. A hole or slit is then cut through the patches by inserting the knife or cutter through the aperture $b$ in the boss, and after the re-enforcing patches have been prepared in this manner one of them is slipped over the boss upon the curved or rounded top $a$ of the flat base, the button-hole is cut in the fabric F of the garment, and the boss B is inserted through it, the fabric being drawn down smooth and even upon the bottom patch E, as shown in the drawings. Next the top patch G is slipped over the boss, when it will be seen that the re-enforcing patches E and G around the button-hole and on opposite sides of the garment will register with each other. The device is now withdrawn and the two patches are united to each other and to the intermediate fabric by a row of stitching H, or by heating.

By the use of this device it will be seen that the re-enforcing patches are all of exactly the same size and shape on both sides of the garment, and that they, when placed upon the fabric ready for stitching or heating, will register perfectly with each other and also with the button-hole, thereby insuring perfect alignment, increased strength and durability, and a neat and finished appearance of the re-enforced button-holes.

Having thus described my invention, I claim and desire to secure by Letters Patent of the United States—

The herein-described combined pattern and guiding device for making re-enforced button-holes, consisting of a base having a flat lower face and curved upper face and the outwardly-flaring tubular boss rising from said base, substantially as and for the purpose described.

In testimony that I claim the foregoing as my own I have hereunto affixed my signature in presence of two witnesses.

CALVIN KEELER.

Witnesses:
WILLIAM WIRT KERR,
FRED G. HARTWELL.